US008237744B2

(12) United States Patent
Joachim et al.

(10) Patent No.: US 8,237,744 B2
(45) Date of Patent: Aug. 7, 2012

(54) METHOD FOR CHANGING SCALE IN A NAVIGATION DEVICE

(75) Inventors: Steffen Joachim, Tauberbischofsheim (DE); Jochen Katzer, Bergtshofen (DE)

(73) Assignee: Garmin Würzburg GmbH (DE)

( * ) Notice: Subject to any disclaimer, the term of this patent is extended or adjusted under 35 U.S.C. 154(b) by 666 days.

(21) Appl. No.: 12/187,118

(22) Filed: Aug. 6, 2008

(65) Prior Publication Data

US 2009/0046111 A1  Feb. 19, 2009

(30) Foreign Application Priority Data

Aug. 14, 2007  (DE) .......................... 10 2007 038 464

(51) Int. Cl.
*G09G 5/00* (2006.01)

(52) U.S. Cl. ........ 345/660; 345/600; 345/661; 345/662; 701/408; 701/431; 701/432; 701/437; 701/445; 701/455

(58) Field of Classification Search .......... 701/200–212, 701/400, 411, 431–437, 445, 455; 345/600–662
See application file for complete search history.

(56) References Cited

U.S. PATENT DOCUMENTS

| 6,163,752 | A | 12/2000 | Sievers et al. | |
|---|---|---|---|---|
| 6,529,822 | B1 * | 3/2003 | Millington et al. | 701/206 |
| 7,613,566 | B1 | 11/2009 | Bolton | 701/212 |
| 2003/0229441 | A1 * | 12/2003 | Pechatnikov et al. | 701/201 |
| 2004/0107043 | A1 * | 6/2004 | de Silva | 701/200 |
| 2004/0243307 | A1 | 12/2004 | Geelen | |
| 2005/0046615 | A1 | 3/2005 | Han | |
| 2006/0025923 | A1 * | 2/2006 | Dotan et al. | 701/207 |
| 2006/0074553 | A1 * | 4/2006 | Foo et al. | 701/212 |
| 2006/0136125 | A1 | 6/2006 | Chua | |
| 2007/0233373 | A1 * | 10/2007 | Choi et al. | 701/209 |
| 2009/0043493 | A1 * | 2/2009 | Sakai | 701/207 |
| 2010/0094533 | A1 * | 4/2010 | Wu | 701/200 |

FOREIGN PATENT DOCUMENTS

| DE | 19815035 A1 | 9/1999 |
|---|---|---|
| DE | 10027516 A1 | 12/2001 |
| EP | 0 678 731 A1 | 10/1995 |
| EP | 1 463 014 A2 | 9/2004 |
| EP | 1 594 102 A2 | 11/2005 |
| EP | 1 983 302 A1 | 10/2008 |

OTHER PUBLICATIONS

European Search Report dated Jun. 11, 2010.
NAVIGON, User's manual MobileNavigator 6, Version Mar. 2007.

* cited by examiner

*Primary Examiner* — Jin-Cheng Wang
(74) *Attorney, Agent, or Firm* — Samuel M. Korte; Mohammad M. Ali

(57) ABSTRACT

A method for operating a navigation device provides a driver with the option of being presented with an overview of the route lying ahead in addition to a detailed illustration of the current position along the route section, namely without any complicated interactions with the navigation device. This navigation device independently changes the scale of the display of the route on the display means in dependence on a manually selected operating mode. The advantage of this method can be seen in a semi-automated solution that always enables the driver to decide exactly which information should be displayed by his navigation device at which time.

10 Claims, 3 Drawing Sheets

METHOD FOR CHANGING SCALE IN A NAVIGATION DEVICE

CROSS-REFERENCE TO RELATED APPLICATION

This application claims the priority benefit of German Patent Application No. 10 2007 038 464.7 filed on Aug. 14, 2007, the contents of which are hereby incorporated by reference as if fully set forth herein in their entirety.

STATEMENT CONCERNING FEDERALLY SPONSORED RESEARCH OR DEVELOPMENT

Not applicable.

FIELD OF THE INVENTION

The invention pertains to a method for operating a device, particularly a navigation device. Navigation devices of the generic type are used especially, but not exclusively, in the form of mobile or permanently installed navigation devices in motor vehicles. In this case, the user has the option of inputting a destination, wherein the navigation device respectively determines the current position of the motor vehicle, in particular, by evaluating GPS-signals and then issues instructions for the driver in order to navigate the vehicle to the destination along a route determined by the navigation device. The number of required navigating instructions is directly dependent on the determined route.

BACKGROUND OF THE INVENTION

On a route that is defined by rural roads or secondary roads, a greater number of navigating instructions and, if applicable, also more complex navigating instructions are required than on a route that is predominantly characterized by an expressway or a straight section due to the more complex routing. However, a route also may alternately consist of complex and less complex sections, for example, when the driver exits the expressway in order to drive into a large city. As the road network becomes denser, one encounters the problem that a few of the navigating instructions do not correctly fit the concrete situation such that the driver of the vehicle becomes confused because he is unable to relate the navigating instructions of the navigation device to the actual route lying ahead.

Various approaches for solving this problem are known. For example, the scale of the illustration shown on the display of the navigation device is changed in accordance with fixed criteria due to the manual intervention of the driver on the navigation device, namely such that the route sections lying ahead are enlarged. The relevant map section for the driver needs to be chosen, for example, by means of a manual graphic selection in such instances and then manually altered with respect to the attention to detail with a zoom function. This distracts the driver from the traffic.

It is also known to zoom in on approaching turning maneuvers. This principle is disclosed in the U.S. Pat. No. 6,529,822 B1. In said patent, the complexity of route sections is determined by means of the starting points and end points of straight route sections, as well as by means of so-called "shape points" that are arranged within and along nonstraight route sections. Depending on the route complexity defined by means of these points, route sections are illustrated on a different scale on the display of the navigation device. On complex route sections, the scale is steadily changed until a limiting value is reached depending on the degree to which the route section fills out a predefined frame or the available display, respectively. The change back to the so-called overview mode does not take place until the vehicle has passed the complex route section and a less complex route section should once again lie ahead.

The disadvantage of this solution can be seen in that the driver can lose the orientation with respect to the route lying ahead while maneuvering through the complex route section due to the lack of a corresponding overview. Signposts provided at the current location or other roadside information cannot be effectively utilized for independently carrying out turns at short notice or for noticing available alternative routes in a timely fashion. The utmost concentration of the driver is required, in particular, on complex route sections such that the driver should not perform any complicated inputs on the navigation device while navigating through these route sections because this also distracts the driver from the traffic.

SUMMARY OF THE INVENTION

Based on this state of the art, the present invention aims to propose a new method for operating a navigation device, in which the driver always has the option of being presented with an overview of the route lying ahead in addition to a detailed illustration of the current position along the route section, namely without any complicated interactions with the navigation device.

This objective is attained in a preferred method for operating a device for determining a route for means of locomotion, particularly a navigation device for a motor vehicle, wherein said device comprises a processor, position signal receiving means, particularly for GPS-signals, a road network database that also contains route-specific information in the form of route attributes, a position determining unit for determining a position from the received position signals, display means for displaying the determined route, display control means for controlling the display means and input means for selecting between a first and a second operating mode of the display means.

The preferred method includes the following steps: a) determining the position with consideration of received position signals and determining the operating mode by querying the input means, as well as independently activating the determined operating mode; b) independently changing the scale for the display of the route on the display means with the aid of the display control means, namely with consideration of the frequency of changes in position, if the first operating mode is selected; and/or c) independently changing the scale for the display of the route on the display means by means of the display control means based on the determined position and with consideration of the route attributes, if the second operating mode is selected.

According to the method of the generic type, the navigation device continuously determines the vehicle position with consideration of the received position signals and calculates a route from the current position to a destination that can be defined by the user therefrom. The calculated route is illustrated on the display means. The display means can be adjusted by the user in such a way that a map or road map, on which the route itself or route sections, particularly the route sections on which the user is currently located, are displayed while traveling along the route. The current position and driving direction are specially indicated in this case, for example, in the form of an arrow symbol.

In order to correctly control the display means, the device continuously determines the type of display mode desired by the user, wherein the user is able to change this display mode at any time. The mode selecting means provided are realized in such a way that the user is able to make a simple selection without being distracted from traffic.

The first operating mode represents a route overview mode and provides the most clear and detailed information possible on the route lying ahead such that the driver can estimate the course of the route and evaluate possible alternative routes. In the route overview mode, an independent scale change is realized by means of the inventive device in dependence on the frequency of changes in position or the speed that can be derived therefrom, respectively. It is possible to choose between two-dimensional and three-dimensional illustrations on the display means. The first operating mode is also suitable for use as long as no route navigation is activated.

The second operating mode represents the route navigation display mode and only provides detailed information on at least one route section lying ahead of the current position such that the user can clearly relate impending navigating instructions to the currently prevailing surroundings. The respective scale or zoom factor chosen for displaying the route in this operating mode is continuously and independently adapted to the mileage by the inventive device in dependence on the current position and the route complexity. The route complexity is assessed by evaluating route attributes assigned to the route. Subsequently, a position-dependent map section that is characterized by its center and its scale is shown on the display means with the aid of the display control means.

In contrast to the solutions known from the state of the art, the route section of particular interest to the user does not have to be manually selected and defined while driving. In the inventive solution, the user simply requests a detailed map from the device manually while the display mode is completely automated.

In comparison with the solution of zooming in on approaching turning maneuvers, the inventive solution provides the advantage that the user can interactively and independently decide which display mode is most suitable for his specific situation at which time. Due to the option of manually controlling the change-over between the route navigation display mode and the route overview mode, the user has the option of also incorporating roadside signposts at the current location into his considerations regarding the further route to be traveled. For example, the driver could refill the fuel tank of the vehicle and purchase provisions before entering an expressway. The user is able to control the display control means such that a detailed overview or a general overview of the route to be followed can be shown on the display means at any time.

The invention ensures a safe drive and an optimal exchange of information between the navigation device and the driver. The inventive zoom function provides a quick overview of the route to be currently traveled and also of alternative routes, for example, in case of TMC traffic jam messages.

In the context of the first operating mode, it is advantageous if the display means are controlled in such a way that the map section displayed is scaled up as the frequency of changes in position increases and is scaled down as the frequency of changes in position decreases. The frequency of changes in position of the navigation system can be evaluated, in particular, in the form of the speed of the vehicle. If the speed of the vehicle increases, fewer details are automatically illustrated because the probability of a planned turning maneuver or U-turn is lower at a faster speed than at a slower speed. This function is sensible, for example, while driving on an expressway, on which only the next exit is usually relevant and a detailed illustration of the surroundings is largely unnecessary. The frequency of changes in position can be derived, for example, from the change of the position signals, e.g., GPS-signals. Alternatively, it would also be conceivable to evaluate other sensors, for example, the electronic speedometer of a vehicle.

If the display is scaled up or scaled down in a linear dependence on the frequency of changes in position, this would result in a continuously changing display as far as the frequency of changes in position is not constant. Consequently, it is preferred to respectively change the scale of the display step-by-step as the frequency of changes in position increases or decreases such that a gradual change-over between at least two scale stages is realized. The scale of the display is respectively constant in the individual scale stages. A range of values of the frequency of changes in position is respectively assigned to each scale stage. The assigned scale stage is automatically adjusted depending on the respectively detected frequency of changes in position. In other words, this means that the scale change is not continuously based on the frequency of changes in position such as, for example, the speed, but that scales are assigned to speed classes and the respective speed class and therefore the respective scale is determined based on the current speed.

In order to prevent an excessively frequent change-over between the scale stages, it is advantageous if the ranges of values of the frequency of changes in position, which are assigned to the different scale stages, overlap one another at least slightly. In this case, the change-over to another scale stage does not take place until the frequency value no longer a lies in the overlapping region of the current scale stage.

The definition of a permissible maximum and/or minimum scale makes it possible to prevent that the scale automatically selected by the device exceeds or falls short of a sensible value with respect to the display. Once this predefined scale is reached, no other scale change is carried out, namely even if the speed continues to change.

It would also be conceivable to control the display means in such a way that a scale change is only realized with respect to a section of the image displayed that can be defined by the user. This image section could be defined, for example, in the form of a predetermined circumscribed circle, the center of which represents the current vehicle position, or in dependence on the still perceivable range of vision of the user.

The navigating instructions that are determined by the device and are dependent on the route section lying ahead are preferably stored in the form of route attributes with respective references to the related route section or the road map. Each route (total distance between starting point and destination) determined by the navigation device can be divided into partial routes or route sections and each route section comprises a certain number of navigating instructions pertaining to the route section.

In the route navigation display mode, an independent scale change therefore can be realized depending on the determined position and the navigating instructions yet to be issued that are dependent on this position. This is implemented in the navigation system in such a way that the complexity of a route section is deduced from the number of determined navigating instructions. On the route section lying ahead, the navigating instructions assigned to this route section represent, in principle, a combination of all maneuvers to be executed by the driver. The higher the number of maneuvers to be executed by the driver within a certain period of time, the more complex the route section to be traveled and the more sensible to provide a detailed illustration of the immediate surroundings on the display means in the route navigation display mode. When the number of navigating instructions decreases, the navigation system can be changed back to the route overview mode.

It is particularly preferred to additionally store locality-specific data in the device in the form of route attributes. For example, it would not be necessary to enlarge a location if fewer than a predetermined minimum number of navigating instructions are associated with this location (for example, three navigating instructions). The size of the locality could also be a criterion for a scale change. It is furthermore sensible if the device also stores road-specific data in the form of route attributes. In this case, a route section is also defined, for example, with consideration of the next expressway interchange or three-leg expressway interchange and the next possible expressway exit or expressway entrance.

It is particularly preferred that the device independently determines at least one alternative route between a starting point and a destination selected by the user. This alternative route can then be taken into consideration in the selection of the scale such that the user has the route to be currently traveled, as well as the possible alternative route, in his field of vision and can switch to this route in a timely fashion.

The device advantageously comprises means for registering and storing control rules for controlling the display means, wherein the scale change is carried out with consideration of these control rules. If applicable, it would also be conceivable and sensible to realize these means in such a way that several control rules can be combined. Several zoom stages can be realized by means of these rules.

The definition of the rules could be based, for example, on the current and/or the next route section, particularly impending expressway interchanges, expressway junctions and all other important information on the route to be traveled. In addition to the mere navigating instructions or additional route attributes, the display means consequently are also controlled in dependence on a user-definable set of rules.

It is particularly advantageous if the display means are controlled in dependence on the control rule in such a way that they either assign priority to the display of the route or the display of a digitized road map stored in the device. Consequently, it is possible to define the extent, to which the display of the current route or the route details is prioritized. For example, if the route departs from the expressway before the next expressway interchange is reached, this expressway interchange is no longer illustrated in the route overview mode if the route is weighted higher. In one possible exception, the next expressway interchange is situated within the maximum radius to be shown that is still displayed in any circumstance. If the stored road map is assigned display priority, the route to be displayed is pushed into the background and a general overview of the road network is always displayed. In accordance with the above-chosen example, the next expressway interchange would always be displayed, if applicable, within a defined maximum radius, namely even if this expressway interchange does not form part of the route. This prioritizing therefore makes it possible to simplify the display in the route overview mode because the illustration is not overloaded with unnecessary details.

It is sensible if the currently selected scale is also shown on the display means at all times such that the user is able to better estimate the distances.

The device advantageously comprises means for registering and storing user-defined route sections, wherein these route sections are taken into consideration in the determination of the route. The user therefore can define mandatory destinations to be visited as part of the route, as well as avoid driving to certain localities or on certain routes, due to the fact that the device respectively takes into consideration or excludes these sections in/from the determination of the route.

It is also sensible that a threshold value for the required minimum scale with respect to a route detail can be defined by means of the route attributes, wherein the display means are controlled with consideration of this minimum scale. This prevents an excessive reduction of details that would make it impossible to still realize a sensible illustration of these details.

The device advantageously detects the manual selection of the operating mode in a tactile, acoustical or optical fashion with the aid of the input means. For example, the display means could comprise input means in the form of a touch-sensitive display area, wherein touching said display area is interpreted by the device as a request to change over the operating mode. In this case, the driver can continue to concentrate on the traffic and is not distracted by complicated operating procedures. This lowers the risk of accidents.

During the change-over between the operating modes, it is particularly preferred to take into consideration a change in position that occurred in the meantime in the control of the display means such that the driver always sees the current route situation on the display means in real time.

The change-over between the second and the first operating mode is sensibly realized in a timed fashion. In this case, the driver does not have to perform, for example, any control manipulations in order to change over from the second to the first operating mode and can fully concentrate on the traffic. The driver manually activates only the change-over from the first to the second operating mode in this case.

One embodiment of the invention is schematically illustrated in the drawings and is described in an exemplary fashion below, wherein not all aspects shown are essential for implementing the inventive method.

DETAILED DESCRIPTION OF THE EXAMPLE EMBODIMENTS

Figure 1:
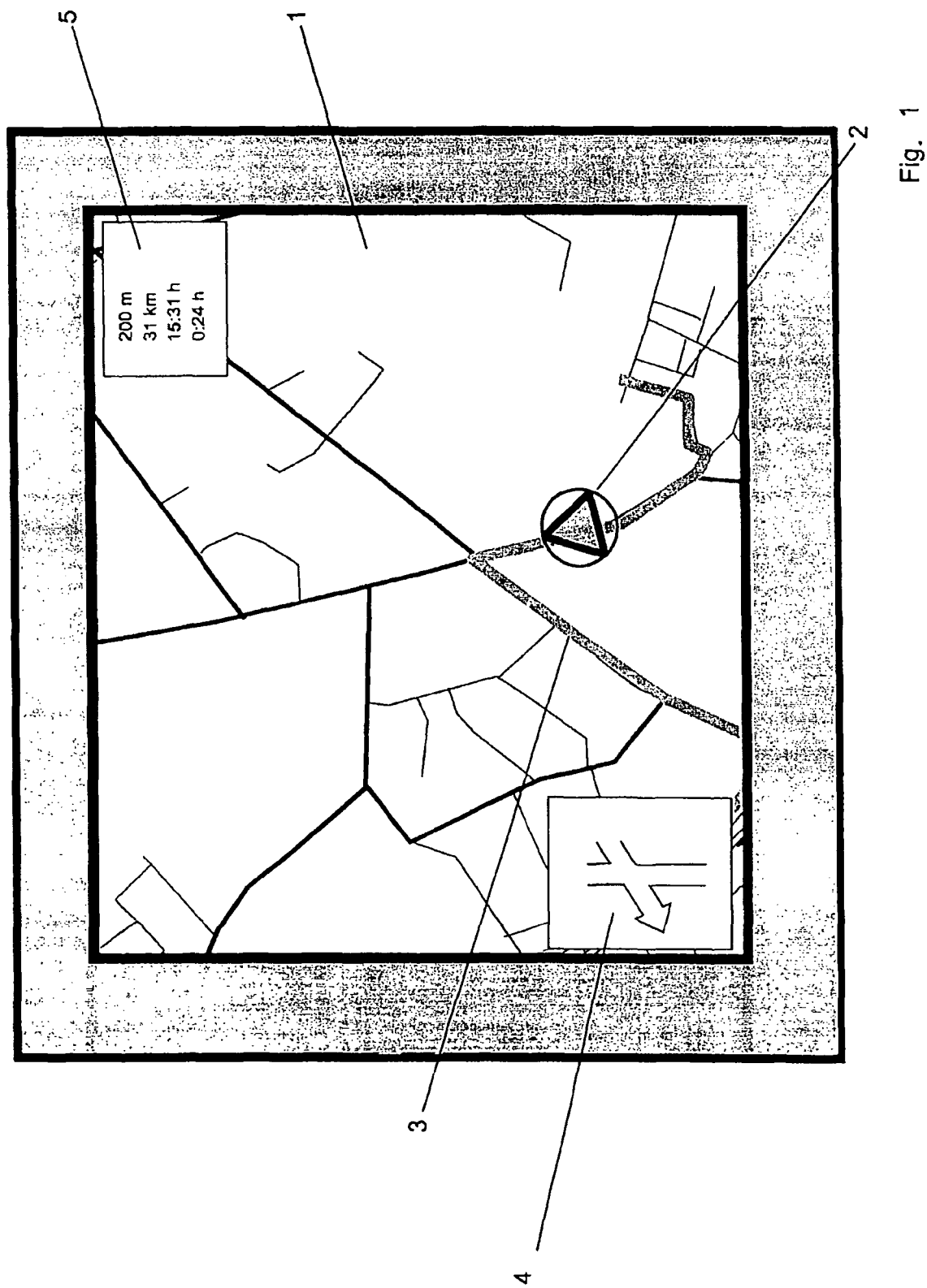
FIG. 1 shows the display means of the inventive navigation system in the "route navigation display mode;"

The inventive navigation system shown in FIG. 1 comprises at least one processor for carrying out calculations associated with the determination of the route 3, position signal receiving means for receiving position signals, particularly GPS-signals, a road network database that also contains route attributes assigned to the route 3, a position determining unit for determining the current vehicle position from the received GPS-position signals, display means for displaying the determined route 3 that is shown in a digital road map 1, display control means for controlling the display means, particularly for changing the scale of the road map 1 displayed together with the route 3 and input means for selecting between at least two operating modes of the display means, wherein the adjustment of the display means can be changed with consideration of the input means by the display control means. The display means also serve for displaying the current vehicle position 2 determined by the position determining unit, wherein the current vehicle position 2 is also shown on the display means in the road map 1 and along the route 3. The route 3 calculated by the navigation device can be entirely or partially displayed in the road map depending on the operating mode.

In the concrete example shown in FIG. 1, the map 1 is aligned in a northward direction and the vehicle position or the current vehicle direction are indicated with an arrow symbol 2. Alternatively, it would also be possible to control the display means in such a way that the map is always displayed from the driver's point of view, i.e., not fixed in a northward direction. If applicable, this makes it easier for the driver to orient himself and the desired type of display can be selected on the navigation device by the driver at his own discretion. In addition, the type of display on the navigation system can be configured. It is possible to choose between a two-dimensional and a three-dimensional display, wherein the northward alignment is not realized in a three-dimensional display.

The display control means display auxiliary information 5 on the route 3 on the display means on demand. This auxiliary information consists, in particular, of the distance to the next navigating instruction determined by the navigation system and/or the remaining distance to the destination along the calculated route 3 that is also determined by the navigation system and/or the display of the time of day and/or the driving time and/or the remaining driving time and/or the estimated arrival time. In this example, the display means also show a detailed view 4 of the next navigating maneuver to be executed if the driver intends to follow the calculated route 3 on the road map 1. From the viewpoint of the driver, this maneuver consists of a sharp left turn. This additional schematic illustration assists the driver in maintaining a clear overview and in simultaneously preparing mentally for the next maneuver.

Other information can be optionally shown on the display means, for example, the GPS-signal strength or the speed limit or the current street name. It would naturally be possible, in principle, to show all information processed by the navigation system on the display means.

It is standard practice to operate the display means in two operating modes when the navigation system is started, preferably in the first operating mode. In this first operating mode, the scale of the road map 1 displayed together with the route 3 is defined based on the vehicle speed. In this embodiment, the speed of the vehicle corresponds to the frequency of changes in position of the navigation system. In FIG. 1, a relatively large map section was chosen in accordance with the current and relatively slow vehicle speed (50 km/h). If the speed is reduced, the map section is additionally enlarged step-by-step. This could be the case, for example, during the impending left turn to be executed by the vehicle 2 in order to follow the route 3. In the extreme case, the vehicle would be at a standstill, for example, while waiting at a traffic light. In such instances, the display control means adapt the scale step-by-step until a predefined threshold value is reached, namely such that the driver is provided with an optimal overview of the current road situation and the imminent navigating maneuvers.

The situation is correspondingly reversed when the vehicle accelerates. The faster the vehicle travels, the larger the map section is adjusted on the display means. It is possible to predefine the extent, to which changes in speed lead to a scale change, by specifying minimal or maximum scales that are assigned to certain speed values. In addition, road types (rural road, country lane, highway or expressway) or local conditions (within a locality or outside a locality) may also be taken into consideration in the scale change.

In the situation shown in FIG. 1 (route navigation display mode), the driver is unable to recognize how the route 3 to be traveled continues at the impending fork after the left-turn maneuver. Existing road signs, for example, with respect to expressway entrances, rest areas, filling stations, etc., cannot be included into the further travel plans by the driver. The reason for this can be seen in the fact that the driver is only provided with details regarding the road lying ahead once it may already be too late. Before entering an expressway, it could be sensible, for example, to stop at a filling station and replenish the fuel supply. If the driver is not informed of the fact that he will be traveling on the expressway for the next 300 kilometers until shortly before the expressway entrance, he may have to turn around or postpone the refueling of the vehicle and, if applicable, pay higher fuel prices at an expressway rest stop.

If the navigation system would have provided the driver with an overview of the impending route section at an earlier time, i.e., prior to reaching the expressway entrance, the driver could have planed all necessary preparations in a proactive and timely fashion without delaying or jeopardizing the further route to be traveled. In order to prevent this, the driver is able to change over the operating mode of the display means from, if applicable, the currently selected "route navigation display mode" to the "route overview mode" with the aid of input means on the navigation device (button, touchscreen display or voice input).

Figure 2:
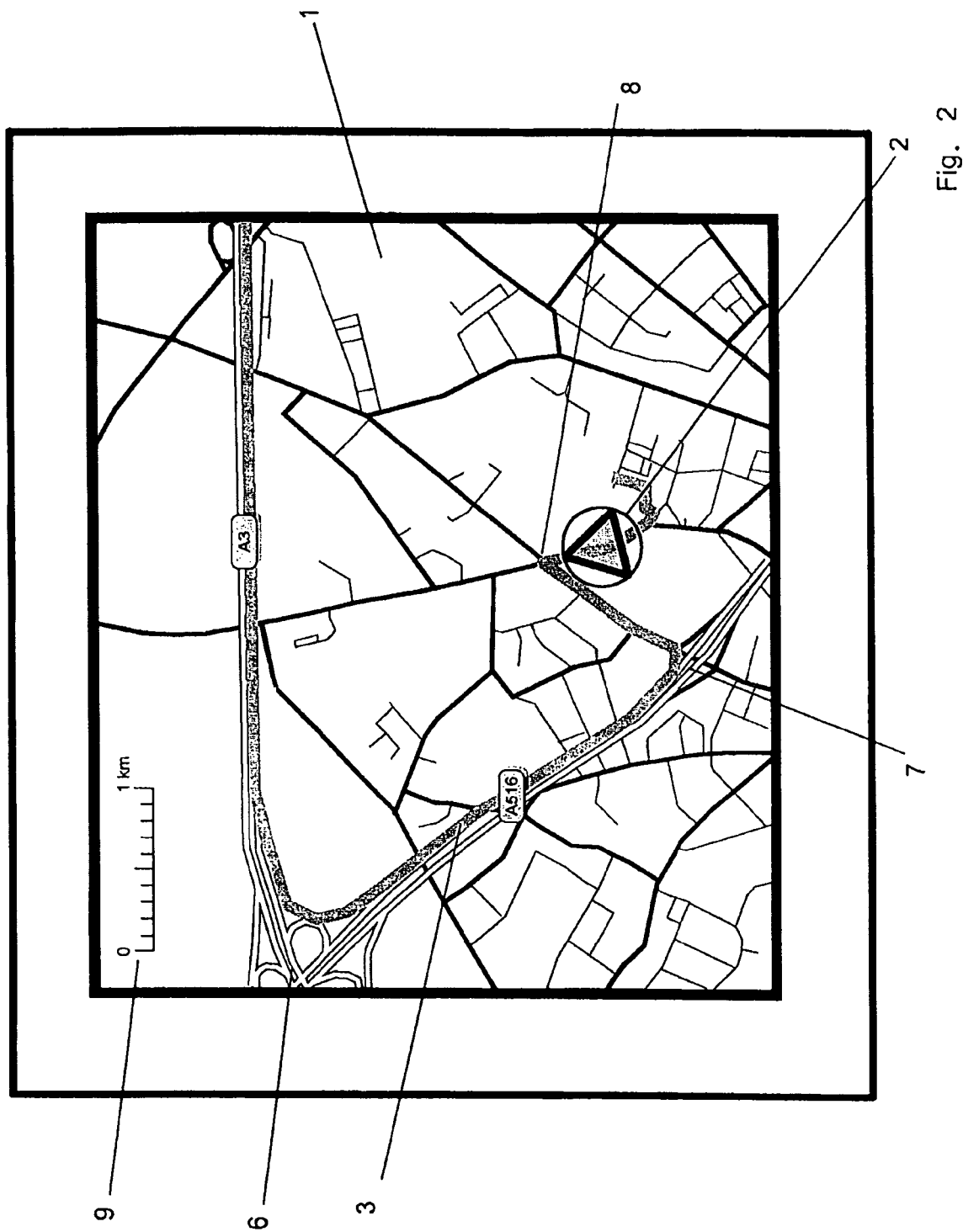
FIG. 2 shows the display means of the inventive navigation system in the "route overview mode.

This operating mode is illustrated in an exemplary fashion in FIG. 2. A comparison between FIG. 1 and FIG. 2 clearly shows that, in the route overview mode, the display means also display the same road map with the same information as in the route navigation display mode (FIG. 1), but this illustration is reduced in comparison with the route navigation display mode such that space for other details of the adjacent surroundings is created on the display of the display means. In order to realize this, the scale of the road map displayed together with the route is changed in the route overview mode such that details required for assessing the route 3 lying ahead are displayed for the driver in a timely fashion and the driver is able to sensibly utilize the existing traffic signs.

In this example, the navigation device selects the scale in such a way that route sections belonging to the next three successive navigating instructions can be displayed on the display means. Consequently, the next expressway junction 7 relevant to the route 3 and the next expressway interchange 6 relevant to the route 3 are shown. The display could also be influenced with consideration of user-defined sequential rules. The display means also display the scale 9 such that the driver is able to better estimate the distances.

In the example shown in FIG. 2, the current vehicle position is also shown on the display means in the form of an arrow 2 and the route 3 is specially identified (bold print). Naturally, it would also be possible to display the auxiliary information 4, 5 on the route 3 and on the next maneuver that was described above with reference to FIG. 1. Other information could also be displayed as described further above. Alternatively, it would be possible to only display the schematic illustration 4 of the next maneuver according to FIG. 1 when the vehicle directly approaches this next maneuver. In the concrete example, the driver recognizes that he needs to enter expressway A516 after the imminent maneuver (sharp left turn) and subsequently enter expressway A3. The signs along the way to the expressway entrance now make it easier for the driver to relate the actually encountered situation to the display of the navigation device. For example, a sign indicating the direction to expressway A516 or expressway A3 may be provided at the next interchange such that the driver is now familiar with the approximate direction of the route and the navigation system could change back to the route navigation display mode or the driver could even manage without any assistance of the navigation system until he reaches the entrance of the expressway. Before the driver enters the expressway, he could still deal with urgent matters, to which he subsequently no longer has the opportunity to attend.

In contrast to driving on country roads or in cities, the trip on the expressway can be displayed in the form of a less detailed map by the display means. This could be controlled, for example, by providing expressway sections with suitable route attributes to be evaluated by the navigation system, wherein the navigation system configures the scale of the map to be displayed on the display means with consideration of these route attributes. Consequently, the driver is provided with a better overview with respect to optional alternative routes in case of accidents, traffic jams or construction sites. The driver may select, for example, alternative expressways or roads that are easier to recognize in the overview mode than in the navigation mode.

The change-over between the operating modes either takes place by querying the input means and/or in a timed fashion such that, for example, the display means can also be automatically changed back over to the currently deactivated operating mode after a predetermined display time of the display means without manual inputs of the driver. The time could be monitored with the aid of a timer that generates a control signal for the display means in order to cause a change-over of the operating mode.

Figure 3:
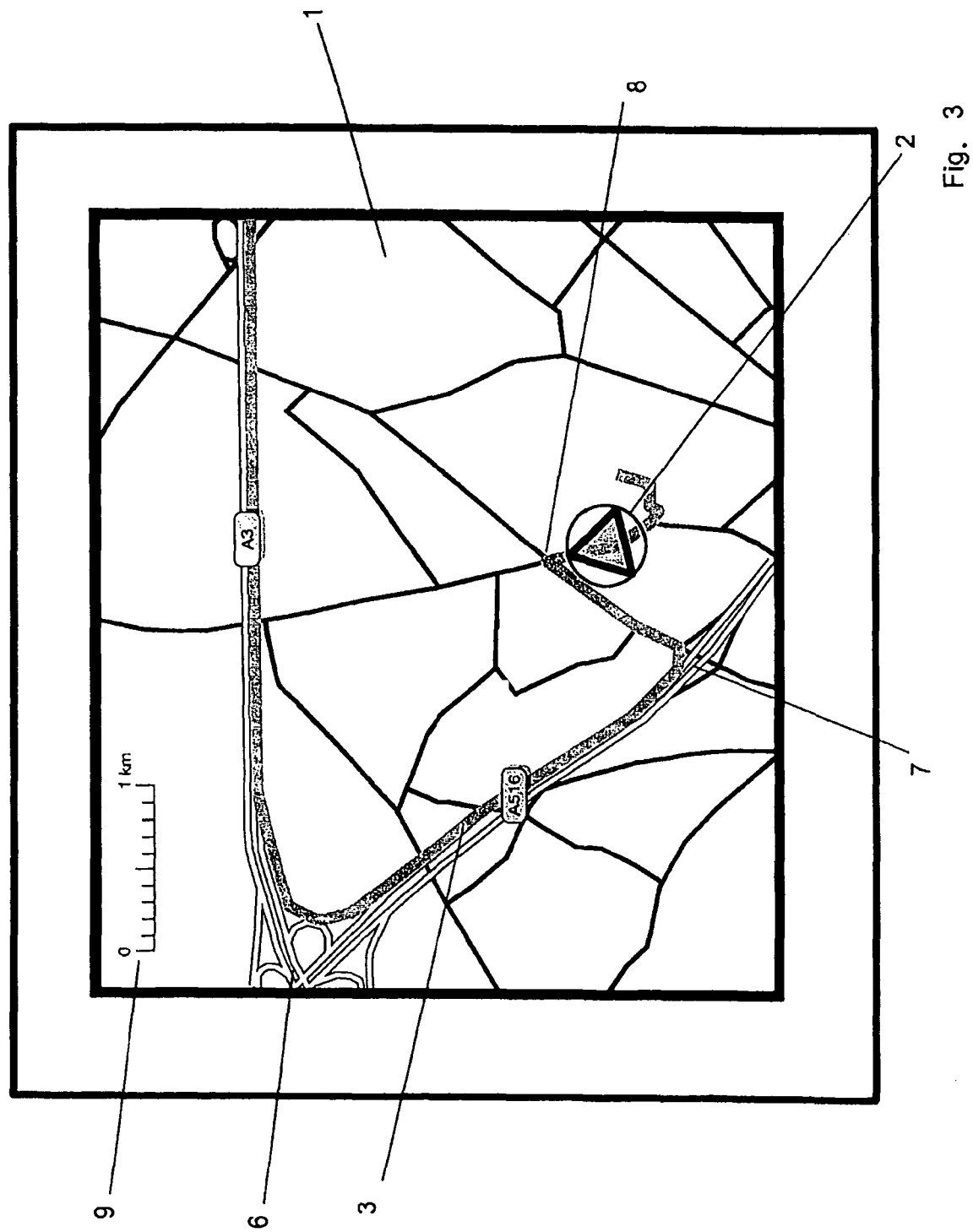
" and FIG. 3 shows the display means of the inventive navigation system according to FIG. 2, however, with blanked-out road details.

FIG. 3 shows the display of an inventive navigation system, in which a minimum scale for the display of route sections by means of the route attributes was defined in the form of a threshold value. The display control means only cause the display of details if the current scale 9 ensures a sensible display with respect to the required resolution of the object to be displayed. A comparison between the map sections 1 illustrated in FIGS. 2 and 3 shows that smaller roads, which apparently are insignificant with respect to the route, are blanked out in FIG. 3. The reason for this is that a minimum scale was assigned to these roads and the currently selected scale of the map section shown no longer makes it possible to realize a useful display of these roads with consideration of this minimum scale. This method would also make it possible to purposefully show or blank out wooded areas, parks, bodies of water, points of particular interest (POIs), etc., by defining a limiting scale with respect to the display of these map elements.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

The invention claimed is:

1. A navigation device comprising:
a display;
a global positioning system receiver operable to determine a current geographic location of the device;
an input operable to be functioned by a user to select one of a route navigation display mode or a route overview mode; and
a processor coupled with the display, the receiver, and the input, the processor operable to:
determine a speed of the device;
calculate a route from the current geographic location of the device to a destination, the calculated route having a plurality of route attributes;
if the route navigation display mode is selected by the user, control the display to present a graphical presentation of at least a portion of the calculated route, wherein the scale of the graphical presentation is automatically varied based on the speed of the device; and
if the route overview mode is selected by the user, control the display to present a graphical presentation of at least a portion of the calculated route, wherein the scale of the graphical presentation is automatically varied based on the position of the device and the route attributes.

2. The device of claim 1, wherein the input is integrated with the display and comprises a touch-sensitive display area.

3. The device of claim 1, wherein the processor determines the speed of the device using a plurality of positions determined by the global positioning system receiver.

4. The device of claim 1, wherein the route attributes include navigating instructions determined by the processor.

5. The device of claim 1, further including a memory operable to store a road network database, the route attributes including data from the road network database.

6. The device of claim 1, wherein the graphical presentation associated with the route navigation display mode is more detailed than the graphical presentation associated with the route overview mode.

7. A method of displaying a route on a navigation device, the method comprising:
receiving an input from a user to select one of a route navigation display mode or a route overview mode;
calculating a current geographic location of the device using a global positioning system receiver;
calculating a route, using a processor associated with the navigation device, from the current geographic location of the device to a destination, the calculated route having a plurality of route attributes;
if the route navigation display mode is selected by the user, displaying on the navigation device a graphical presentation of at least a portion of the calculated route and automatically varying the scale of the graphical presentation based on a speed of the device; and
if the route overview mode is selected by the user, displaying on the navigation device a graphical presentation of at least a portion of the calculated route and automatically varying the scale of the graphical presentation based on the position of the device and the route attributes.

8. The method of claim 7, wherein the route attributes include navigating instructions determined by the processor.

9. The method of claim 7, wherein the route attributes include data from a road network database.

10. The method of claim 7, wherein the graphical presentation associated with the route navigation display mode is more detailed than the graphical presentation associated with the route overview mode.

* * * * *